United States Patent Office 3,701,647
Patented Oct. 31, 1972

---

3,701,647
PROCESS FOR OBTAINING NICKEL CONCEN-
TRATES FROM NICKEL OXIDE ORES
Hiroshi Yasui, Tokyo, and Mitsuo Takahashi, Toda,
Japan, assignors to Nippon Mining Co., Ltd.
No Drawing. Filed Feb. 13, 1970, Ser. No. 11,303
Claims priority, application Japan, Feb. 17, 1969,
44/11,020
Int. Cl. C22b 1/08, 23/06
U.S. Cl. 75—3                        10 Claims

ABSTRACT OF THE DISCLOSURE

The nickel grade of nickel oxide ores containing silicic acid and magnesia is improved by process of pulverizing the ore, and then calcining and roasting the pulverized ore at a temperature above 750° C. so that the mineral structure of the ore is transformed into the forsterite or enstatite form. The thus treated ore is then subjected to a segregation reaction whereby the nickel is separated in the form of ferronickel particles, and then the ore is concentrated by magnetic or flotation separation in the usual manner, whereby a high grade nickel concentrate is obtained.

BACKGROUND OF THE INVENTION

Nickel oxide ores, mined in Southeast Asia, Cuba, Czechoslovakia, and other countries are important sources of nickel. They are refined by a wet or dry process, depending upon the composition of the ore and the conditions of location of a particular refinery. The wet process involves "High Pressure Sulfuric Acid Selective Leaching," the method applied to a nickel oxide ore having little alkali or alkali earth content and "Ammonia Leaching," the method which requires ore blending so that the iron content of the material may be kept constant and at a suitable value. In the wet process, therefore, the variety of ores to be handled is rather limited. On the other hand, the dry process is usually applied to types of ore such as serpentine- or talc-type garnierite both of which have a relatively low iron content. Though the overall output of these ores has steadily increased year after year, there is every indication that the nickel content of the ores is rapidly dwindling.

For example, the nickel content of the oxide ores mined in New Caledonia during the years 1951 to 1960 was on the average of 3.3%. The average value during the period 1961 to 1965 decreased to 3.0% (estimated), and indications are that the value will drop further to an average of 2.6% to 2.7% during the period 1967 to 1970. If the tendency toward the lower grade persists, the cost of refining nickel ores will increase in the near future to a level which will be unprofitable. Therefore, to cope with the necessity of obtaining nickel from a lower grade of nickel ores, an effective process for increasing the nickel content of the ores through a metallurgical treatment would be very useful.

Segregation, a widely known process for collecting metallic copper from copper oxide ores, is not directly applicable to the concentration of nickel ores because of various difficulties it involves. For example, nickel ores require more time for the segregation reaction than copper ores, thus raising problems of equipment corrosion to meet the requirement. Nickel ores also need higher processing temperatures than do copper ores because of the difficulty in forming nickel chloride due to the characteristic difference between nickel oxide and copper oxide in their behaviors in the chlorination reaction. Further, difficulty is involved in selective extraction of nickel from ores having a large content of iron which tends to show much the same characteristics as nickel in this kind of chemical reaction.

The segregation reaction involves the addition of a chloridizing agent and a reducing agent to an ore and is carried out at an elevated temperature. Usually nickel oxide ores consist essentially of goethite, talc- or serpentine-garnierite, and quartz, which invariably contain water of crystallization. If a halide such as sodium choride or calcium chloride is added as a chloridizing agent to ore and heated together with the addition of coke or anthracite for segregation at a temperature above 900° C., the chloride added is decomposed at a temperature of about 650° C. at which temperature water of crystallization is removed from the ore, with the result that chlorine or hydrogen chloride gas produced by the decomposition escapes from the reaction system. For this reason, according to conventional segregation, a great amount of chloride would have to be consumed, a significant economic disadvantage.

These and other difficulties have rendered it next to impossible to develop a useful technique for the concentration of nickel ores.

SUMMARY OF THE INVENTION

A principal object of the present invention is the provision of a process for increasing the nickel content of nickel ores.

Another object of the present invention is the provision of a process for concentrating nickel oxide ores to obtain nickel concentrates to be used as materials for fire refining whereby the foregoing difficulties are overcome.

A further object of the present invention is the provision of a process whereby low-grade nickel oxide ores which have heretofore been neglected for economical reason may be used effectively as a new source of metallic nickel.

According to the present invention, an increase in the nickel content of nickel oxide ores, particularly those of low nickel content is increased by segregation. It has now been discovered that the disadvantages connected with known segregation processes can be eliminated by heating the ore and removing the water of crystallization contained therein prior to the segregation reaction, and that the use of a heating temperature of about 750° C. for the removal of the water crystallization has an extremely beneficial effect upon the subsequent segregation reaction; the yield of the concentrate obtained by separation following the segregation is materially increased. It has also been found that the process is advantageously carried out on ore which has been pulverized and pelletized.

According to the present invention a nickel oxide ore is pulverized and then pelletized into pellets up to 5 mm. in diameter. The pellets are then calcined at a temperature of at least about 750° C. to transform the mineral structure into that of forsterite or enstatite; the calcined ore is then admixed with chloridizing agent and a carbonaceous reducing agent and subjected to a segregation reaction. Separation of the resultant product yields the desired nickel concentrate.

DESCRIPTION OF THE INVENTION

The process of the invention involves pulverizing the ore, pelletizing the pulverized ore and calcining the pelletized ore and then charging the calcined ore into a furnace to carry out a segregation reaction.

While the present invention is not limited to a particular theory, it is believed that favorable results of this process may be attributable to the fact that the thermal dehydration and ensuing heating of the ore brings changes in the mineral composition and transform the ore into forsterite or enstatite, the nickel content of which resists direct reduction to metallic nickel during the segregation reaction by the reducing agent added and the reducing gas produced thereby. Thus, in the present process the nickel in the ore is believed to be converted first into nickel chloride by means of the chlorine or hydrogen chloride from the chloridizing agent, then reduced with hydrogen to nickel, which deposits on a carbonaceous substance such as coke.

In other words, it appears likely that, in the present process, reduction of the nickel content of the ore to nickel by way of nickel chloride takes place preferentially, rather than the direct reduction to metallic nickel.

The heating calcining, as above described, is a feature of the present invention. Although dependent to some extent upon the place of origin, nickel oxide ore loses the water of crystallization of goethite at 310° to 330° C. and that of serpentine- and talc-type garnierite at about 650° C. and is transformed upon further heating into forsterite or enstatite. The transformation point is usually within the range of 740° to 850° C. though it varies according to the location of the mine from which the ore is obtained. The roasting or calcining is therefore carried out at a temperature between 750° and 840° C. or above. In view of the nickel grade and yield of the concentrate after segregation, a desirable temperature for calcination ranges from 950° to 1050° C. There is no necessity for calcining for a very long time, and usually a calcining period of 30 to 60 minutes is sufficient.

Another feature of the present invention is pelletizing. The invention provides a process for effecting the segregation reaction through a combination of pelletizing and calcining.

The time required for completing the segregation reaction for a nickel oxide ore, though differing with the place of origin of the ore, is approximately fifteen minutes in the case of ore of grain size of −250 mesh and 90–120 minutes in the case of ore −10 mesh, both at 1000° C. In the segregation reaction, it is preferred that the space of the reaction chamber be as small as possible so that losses of chlorine or hydrogen chloride and the reaction gas from the chloridizing and the reducing agents are avoided and their effective reaction with the ore secured.

From an economical point of view, with respect to the reaction gas in a reaction chamber, the moving bed furnace of packed bed type seems to be most desirable. The moving bed furnace is the type of furnace which utilizes gravitation to move the ore under treatment, and if powdered or pulverized ore is placed in the furnace at a high temperature for a long time, a phenomenon called hanging or bridging tends to come into existence and constant movement of the ore is necessarily hampered. Supposing the ore is moved at the rate of, for instance, two meters a minute where no hanging or bridging takes, the segregation reaction furnace should be at least as long as 30 meters considering the rate of flow of the ore; realization of such a furnace for commercial use is beyond consideration.

The present invention has completely solved the problems described above. More specifically, the ore is pulverized to a grain size of, for instance, less than −200 mesh and the pulverized ore is then pelletized. After pelletizing, the ore is heated and dehydrated and mineral transformation is effected by means of calcination as already described. The segregation reaction is then carried out by admixing the ore with a chloridizing agent and a reducing agent. Due to pelletizing, hanging or bridging doesn't occur and the smooth and constant transfer of the ore are ensured in spite of the fact that the rate of the flow of the ore is 3 to 5 mm. a minute.

It is not desirable to add the chloridizing agent and the reducing agent to the powdered ore prior to calcination, because during dehydration the chloridizing agent is decomposed and lost and also direct reduction takes place which has a poor effect with respect to the segregation reaction. In order to establish favorable conditions for the reaction of gases from the chloridizing and the reducing agents, small pellets, the grain size of which is about 5 mm. or less in diameter are provided whereby the reaction takes place swiftly.

If pellets of a size larger than 5 mm. for instance, 10 to 20 mm. in diameter are used, as is usual, the space between each pellet becomes large, and the reaction gas from the chloridizing and the reducing agent go out of the reaction system easily through the spaces without reacting. Consequently, when large pellets are used, the volume of reaction gas participating in segregation reaction with respect to each pellet is small and the segregation reaction is far from complete.

The ore is pulverized and pelletized into pellets which are 5 mm. or under in diameter and dehydrated and calcined, and after providing the required sensible heat, with the addition of the reducing and the chloridizing agent, the segregation reaction is effected in an air-tight furnace preferably of the moving bed type. After the reaction, the product is cooled in such a manner as to avoid oxidation, and nickel is recovered by magnetic or floatation separation. In this way concentrates having a nickel content of 10 to 30 percent are obtained from low-grade nickel oxide ores at yield of about 80 percent. To make the present process even more effective chloride gas can also be used.

The mineral structure or composition of nickel oxide ores differs according to the place of origin, and therefore the technique for obtaining nickel by means of segregation is sometimes easy and sometimes difficult with a specific ore. For instance, the application of segregation to nickel oxide ores from New Caledonia results in different yields of nickel, depending on the mine at which they have been produced, even though conditions of dehydration, calcination and segregation are the same. For example, when segregation is carried out under the following conditions: 2% of coke, 2% of sodium chloride, at 1000° C. for 2 hours, one nickel concentrate of 10 to 30% nickel grade results in a yield of nickel of 80% while the other 6 to 8% nickel grade results in a yield of 60 to 70%. The difference is very conspicuous. The reason why the effectiveness of the segregation treatment of nickel oxide ores differs with specific ores seems to be ascribable to the fact that the stage of weathering of every ore is different and ration of content of iron, silicic acid and magnesia is also different.

According to the present invention, it has been found that the use of chlorine gas as a chloridizing agent leads to complete elimination of the difference in effectiveness of the segregation treatment with kinds of ore described above. Chlorine gas has a greater chloridizing power than sodium chloride or calcium chloride heretofore used as a chloridizing agent. It also has an advantage, as a gaseous body, of being easily introduced into the segregation system. In particular, a little moisture added to chlorine contributes to a better yield of nickel. The ratio of chlorine gas to be used in treating the ore in the present invention is not less than 0.5%. The use of a large quantity of chlorine gas is of course not economical. The use of chlorine gas in an amount of more than 3% in treating the ore hampers the constant transfer of the ore due to the production of iron chloride, a by-product, even though the pelletized ore is used. Therefore the use of 1 to 2 percent of chlorine is most preferable. The use of sodium chloride or calcium chloride in the present invention also makes the segregation reaction stable, independent of the kind of ore.

As the reducing agent in the segregation reaction, a solid carbonaceous reducing agent such as coke or anthracite is used. The reducing agent is used in an amount of 1 to 10 percent. Usually in insufficient proportion of the reducing agent results in poor yield of nickel though the grade of the concentrate is high, and conversely too much reducing agent leads to excessive reduction of the ferrous content and a decline of the nickel content of the resulting concentrate. To raise both the grade and yield of nickel of the concentrate, the presence of the reducing agent in an amount of 2 to 3 percent by weight is preferable, based on ore which has been dehydrated and calcined.

With regard to the grain size of the reducing agent, in order to obtain the best quality and yield of nickel concentrate, the size of the particles of reducing agent used is preferably in the range of about +200 to −60 mesh. If the grains are excessively coarse, the reducing agent does not react adequately and fails to participate in the segregation reaction satisfactorily, with a consequent reduction of the nickel grade and yield. If the grains are too fine, the reduction reaction is intensified and causes the aration, nickel concentrate was obtained. Reaction conditions and results were as shown in Table 1.

For the sake of comparison, samples not calcined and samples calcined at a temperature outside the scope of the present invention were subjected to the segregation reaction in the same manner as above described. The results are given in Table 2.

Analyses of the ores used as materials in the examples and also in the comparative examples of processes which do not illustrate the present invention described above are shown in Table 3. In the examples of Table 2, the rate of transfer of the ore is 3 to 5 mm. per minute.

TABLE 1

| Example No. | 1 | 2 | 3 | 4 | 5 | 6 | 7 | 8 | 9 |
|---|---|---|---|---|---|---|---|---|---|
| Kind of ore | A | A | B | B | B | C | C | D | D |
| Pellet size | 3 mm. in diam., spherical | 3 mm. in diam., spherical | 5 mm. in diam., spherical | 1 mm. φx 2–5 mm., columnar | 1 mm. φx 2–5 mm., columnar | 1 mm. φx 2–5 mm., columnar | 1 mm. φx 2–5 mm., columnar | 1 mm. φx 2–5 mm., columnar | 1 mm. φx 2–5 mm., columnar |
| Reaction temp.,° C. | 1,000 | 1,000 | 1,000 | 900 | 900 | 1,000 | 900 | 1,000 | 1,000 |
| Reaction period, hr | 2 | 2 | 2 | 4 | 4 | 2 | 4 | 2 | 2 |
| Choke wt. percent | 2 | 2 | 3 | 4 | 5 | 2 | 4 | 2 | 2 |
| Chloridizing agent, wt. percent | $Cl_2$, 1.2 | $Cl_2$, 1.2 | $Cl_2$, 1.5 | $Cl_2$, 1.5 | $Cl_2$, 1.5 | $Cl_2$, 1.5 | $Cl_2$, 1.5 | $Cl_2$, 1.5 | $Cl_2$, 2.0 |
| $H_2O$ in $Cl_2$ gas, vol. percent | 0 | 5.0 | 0 | 0 | 5.0 | 5.0 | 5.0 | 5.0 | 5.0 |
| Conc. Ni grade, percent | 19.0 | 19.4 | 30.3 | 20.3 | 17.0 | 15.0 | 14.8 | 22.9 | 25.2 |
| Conc. Ni yield, percent | 73.1 | 79.4 | 77.9 | 75.7 | 86.7 | 87.4 | 83.4 | 84.3 | 79.4 |
| Ore moving conditions | Fair | Fair | Fair | Fair | Fair | Fair | Fair | Fair | Fair |

TABLE 2

| Example No. | 10R | 11R | 12R | 13R | 14R |
|---|---|---|---|---|---|
| Kind of ore | B | B | B | B | D |
| Pellet size | Without pelletizing, −10 mesh | Without pelletizing, −10 mesh | 5 mm. in diameter, spherical | Without pelletizing, −10 mesh | Without pelletizing, −10 mesh |
| Calcining conditions | 850° C. 30 min | 1,000° C., 30 min | 700° C., 30 min | 1,000° C., 30 min | 1,000° C., 30 min |
| Reaction temp., ° C. | 1,000 | 900 | 1,000 | 900 | 1,000 |
| Reaction period, hr | 2 | 4 | 2 | 4 | 2 |
| Reducing agent, wt. percent | 2 | 2 | 3 | 4 | 2 |
| Chloridizing agent, wt. percent | $Cl_2$, 1.5 | $Cl_2$, 1.5 | $Cl_2$, 1.5 | NaCl, 2 | NaCl, 2 |
| $H_2O$ in $Cl_2$ gas, vol. percent | 0 | 50 | 0 | | |
| Conc. Ni grade, percent | 20.1 | 16.7 | 6.3 | 19.1 | 4.7 |
| Conc. Ni yield, percent | 72.9 | 85.0 | 22.7 | 51.4 | 59.0 |
| Ore moving conditions | Hanging occurs | Hanging occurs | Fair | Hanging occurs | Hanging occurs | direct reduction of the ferrous content, again leading to a poor quality of concentrate. For these reasons, the grain size of the reducing agent, for example in the case of coal coke, is in the range of +200 to −100 mesh, though it varies to certain extent with the reducing power of a particular agent.

For a successful segregation reaction a temperature of at least 900° C. is required. At temperatures between 800° C. and 850° C. or less, the reaction seldom takes place and practically no condensed nickel concentrate can be obtained by means of subsequent flotation or magnetic separation. At 1200° C. or above 1200° C., cohesion among the ore grains increases to such an extent that the flow of the material in the reaction zone is hampered, and this is deleterious on the segregation reaction. In view of these effects, a segregation reaction temperature between 900° C. and 1200° C. is preferred.

The present invention will be further described by the following specific examples, which illustrate the best mode currently contemplated for carrying out the invention, but which should not be construed as limiting the scope of the invention in any manner.

EXAMPLES

The nickel oxide ore from New Caldonia was pulverized to −200 mesh, 80% up, pelletized to pellets of 1 to 5 mm. in diameter, and calcined and dehydrated in a heating furnace at a temperature of 1000° C. for 30 minutes.

The pellets calcined were charged continuously to a externally-heated vertical segregation furnace of 60 mm. in diameter and 600 mm. in length. Pulverized coke as a reducing agent and chlorine gas as a chloridizing agent were also charged in the furnace and the segregation reaction was effected. The resulting product was discharged continuously. As for chlorine gas, dried chlorine or chlorine containing 5% by volume of moisture was used respectively. Segregation reactants were pulverized in a vibration mill and after application of wet magnetic sep-

TABLE 3

| Kind of Ore | Grade, percent | | | |
|---|---|---|---|---|
|  | Ni | Fe | $SiO_2$ | MgO |
| A from New Caledonia | 2.83 | 12.79 | 31.90 | 24.90 |
| B from New Caledonia | 2.85 | 12.36 | 42.80 | 23.29 |
| C from New Caledonia | 2.53 | 7.77 | 41.75 | 28.49 |
| D from New Caledonia | 1.73 | 8.59 | 38.82 | 29.59 |

We claim:
1. In a process for obtaining nickel concentrate from nickel oxide ores by carrying out a segregation reaction on said ore by heating said ore at a temperature of about 900° to 1000° C. in the presence of a carbonaceous reducing agent and a chloridizing agent and thereafter concentrating the resultant product to obtain a nickel concentrate, the improvement which comprises pulverizing and pelletizing said nickel oxide ore ino pellets not more than 5 mm. in diameter, calcining said pellets at the temperature of about 750° C., the temperature and period of calcination being sufficient to transform the mineral structure into that of forsterite or enstatite, charging said thus heated and transformed ore into a vertical moving bed furnace of the gravity type and adding chlorine as the chloridizing agent to said thus heated calcined ore in said furnace to effect said segregation reaction.

2. A process according to claim 1, wherein the chloridizing agent is a mixture of chlorine and steam.

3. Process according to claim 1 in which the chloridizing agent is chlorine, which is used in an amount of about 0.5 to 3% by weight of said ore.

4. Process according to claim 1 in which the chloridizing agent is a mixture of chlorine and steam, the amount of steam being about 5% by volume based on the volume of chlorine.

5. Process according to claim 1 in which said calcination is carried out at a temperature in the range of about 950° C. to 1050° C.

6. Process according to claim 1 in which said heated and pelleted ore is charged continuously into said furnace and the product from said segregation reaction is continuously withdrawn from said furnace.

7. A process for obtaining nickel concentrate from nickel oxide ores which comprises pulverizing and pelletizing a nickel oxide ore into pellets of about 1 to about 5 mm. in diameter, calcining said pellets at the temperature of above at least about 750° C. the temperature being sufficient to transform the mineral structure into forsterite of enstatite, continuously introducing said thus heated calcined pellets into a vertical moving bed furnace, adding coke as a carbonaceous reducing agent to said furnace, blowing chlorine gas into the furnace to effect a segregation reaction at a temperature of about 900–1000° C., continuously discharging the resultant product from said furnace, and thereafter concentrating the resultant product to obtain a nickel concentrate.

8. Process according to claim 7 in which said pellets are calcined at a temperature of about 950° C. to 1050° C.

9. A process according to claim 7, in which steam is also blown into said moving bed furnace.

10. Process according to claim 7 in which about 5% by volume of steam, based on the volume of chlorine, is blown into said moving bed furnace.

References Cited

UNITED STATES PATENTS

| | | | |
|---|---|---|---|
| 3,453,101 | 7/1969 | Takahashi et al. | 75—119 X |
| 3,466,144 | 9/1969 | Kay | 75—119 X |
| 2,766,115 | 10/1956 | Graham et al. | 75—119 |
| 3,318,685 | 5/1967 | Handwerk | 75—3 |
| 2,104,741 | 1/1938 | Fink | 75—112 |
| 2,698,777 | 1/1955 | Hartwick et al. | 75—112 X |
| 3,232,743 | 2/1966 | Anna | 75—3 X |

FOREIGN PATENTS

| | | | |
|---|---|---|---|
| 110,948 | 11/1917 | Great Britain | 75—112 |
| 301,342 | 11/1928 | Great Britain | 75—112 |

ALLEN B. CURTIS, Primary Examiner

U.S. Cl. X.R.

75—112, 119